US009489052B2

(12) United States Patent
Saka

(10) Patent No.: US 9,489,052 B2
(45) Date of Patent: Nov. 8, 2016

(54) IMAGE RECOGNITION DEVICE, IMAGE RECOGNITION METHOD, IMAGE RECOGNITION PROGRAM, AND RECORDING MEDIUM

(75) Inventor: Tsuyoshi Saka, Saitama (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/387,549

(22) PCT Filed: Mar. 29, 2012

(86) PCT No.: PCT/JP2012/058424
§ 371 (c)(1),
(2), (4) Date: Sep. 24, 2014

(87) PCT Pub. No.: WO2013/145223
PCT Pub. Date: Oct. 3, 2013

(65) Prior Publication Data
US 2015/0301607 A1    Oct. 22, 2015

(51) Int. Cl.
*G06F 3/042* (2006.01)
*G03B 17/00* (2006.01)
*G06F 3/01* (2006.01)
(Continued)

(52) U.S. Cl.
CPC .............. *G06F 3/017* (2013.01); *B60K 37/06* (2013.01); *G06F 3/0304* (2013.01); *G06F 3/0425* (2013.01); *G06F 3/04817* (2013.01); *G06T 7/0048* (2013.01); *B60K 2350/1052* (2013.01);
(Continued)

(58) Field of Classification Search
CPC .... G06F 3/017; G06F 3/0425; G06T 7/0048
USPC ............................................. 395/55; 345/175
See application file for complete search history.

(56) References Cited

U.S. PATENT DOCUMENTS 6,067,420 A * 5/2000 Hara et al. ....................... 396/55
2005/0134117 A1    6/2005 Ito et al.

FOREIGN PATENT DOCUMENTS

JP    2005-293419    10/2005
(Continued)

OTHER PUBLICATIONS

International Search Report—PCT/JP2012/058424—Jun. 19, 2012.
Japanese Office Action dated Aug. 29, 2016 in corresponding Japanese Patent Application No. 2015-237349 with English translation of Japanese Office Action.
(Continued)

*Primary Examiner* — Andrew Sasinowski
*Assistant Examiner* — Kuo Woo
(74) *Attorney, Agent, or Firm* — Young & Thompson

(57) ABSTRACT

A secondary coupled vibration occurs between a hand portion of the user and a vehicle due to an influence of a direct vibration of the vehicle. The coupled vibration differs in a deflection width, and generation timing and peak timing of a vibration depending on user's various individual conditions. A difference amount calculation unit and a user-based characteristic learning unit analyze and store a correspondence relation of an acceleration and the coupled vibration, and thereby learn a characteristic of the coupled vibration corresponding to the user. The coupled vibration corresponding to the user can be detected with high accuracy by checking the detected acceleration against a learning result. A position of an indication point indicated by the hand of the user can be recognized with high accuracy by correcting a position of a captured image itself by element of the detected coupled vibration.

9 Claims, 10 Drawing Sheets

A, A+B, A+C : GROUND REFERENCE VIBRATION AMOUNT
B, C : RELATIVE VIBRATION AMOUNT

(51) Int. Cl.
  *B60K 37/06* (2006.01)
  *G06T 7/00* (2006.01)
  *G06F 3/03* (2006.01)
  *G06F 3/0481* (2013.01)
(52) U.S. Cl.
  CPC .................. *B60K 2350/2013* (2013.01); *G06F 2203/04108* (2013.01)

(56) References Cited

FOREIGN PATENT DOCUMENTS

| | | |
|---|---|---|
| JP | 2006-143159 | 6/2006 |
| JP | 2008-027363 | 2/2008 |
| JP | 2009-217477 | 9/2009 |

\* cited by examiner

PULL-IN PROCESSING TO OPERATION ICON

IMAGE RECOGNITION DEVICE, IMAGE RECOGNITION METHOD, IMAGE RECOGNITION PROGRAM, AND RECORDING MEDIUM

CROSS-REFERENCE TO RELATED APPLICATION

This is an application PCT/JP2012/058424, filed Mar. 29, 2012, which was not published under PCT article 21(2) in English.

BACKGROUND OF THE INVENTION

1. Field of the Invention

The present invention relates to an image recognition device that recognizes a position of a recognition object in an image captured by a camera, an image recognition method, an image recognition program, and a recording medium.

2. Description of the Related Art

In recent years, have been proposed many image recognition technologies for recognizing a position of a predetermined recognition object in an image captured by a camera. In order to perform this position recognition with high accuracy, it is necessary to take sufficient measures to perform correction of a captured image, etc. with respect to a vibration applied to the camera is subjected.

In contrast with this, for example, a prior art described in JP, A, 2006-317848 detects a movement vector of a background of an image captured by a camera, and performs correction to user's camera shake by moving an optical-axis shift lens by means of a vector opposite to the movement vector, thereby allowing for panning without blurring of a subject.

Meanwhile, in recent years, as an operation input method for an interface device mounted on a moving body, such as a vehicle, for example, has been proposed a gesture operation input technology for performing image recognition of a position of a hand raised by a user in front of a camera included in the interface device, and inputting a selection indication corresponding to the position. Here, although a vibration (blurring) is generated also at the position of the hand which is image-recognized due to generation of a vibration associated with running of the moving body, a relative vibration between a body itself of the user and the moving body is also synthesized and included in the vibration in this case in addition to a relative vibration between the interface device itself including the camera and the moving body.

In the above-described prior art, although correction to the relative vibration between the camera itself and the moving body can be performed, the relative vibration between the body itself of the user and the moving body cannot be dealt with at all. For this reason, there has been demanded a technology that can improve recognition accuracy in recognizing a position of a predetermined body portion of the user riding on the moving body by means of an image captured by the camera mounted on the moving body.

SUMMARY OF THE INVENTION

Problems that the present invention aims to solve include the above-described problem as one example.

Means for Solving the Problem

In order to achieve the above-described object, according to the invention of claim 1, there is provided an image recognition device comprising an imaging unit disposed in a moving body, that captures an image of a user riding on the moving body; an acceleration detection unit that detects an acceleration added to said imaging unit; a coupled vibration detection unit that detects a relative coupled vibration between said moving body and said user based on said acceleration; and a recognition unit that recognizes a position of a predetermined body portion of said user based on said image captured by said imaging unit and said coupled vibration.

In order to achieve the above-described object, according to the invention of claim 7, there is provided an image recognition method executing the steps of an imaging step for capturing an image of a user riding on a moving body by an imaging unit disposed in the moving body; an acceleration detection step for detecting an acceleration added to said imaging unit; a coupled vibration detection step for detecting a relative coupled vibration between said moving body and said user based on said acceleration; and a recognition step for recognizing a position of a predetermined body portion of said user based on said image captured in said imaging step and said coupled vibration.

In order to achieve the above-described object, according to the invention of claim 9, there is provided a recording medium capable of reading by an image recognition device, storing an image recognition program for executing the image recognition method according to claim 7 on the image recognition device.

DETAILED DESCRIPTION OF THE PREFERRED EMBODIMENTS

Hereinafter, one of embodiments of the present invention will be explained with reference to drawings.

Figure 1:
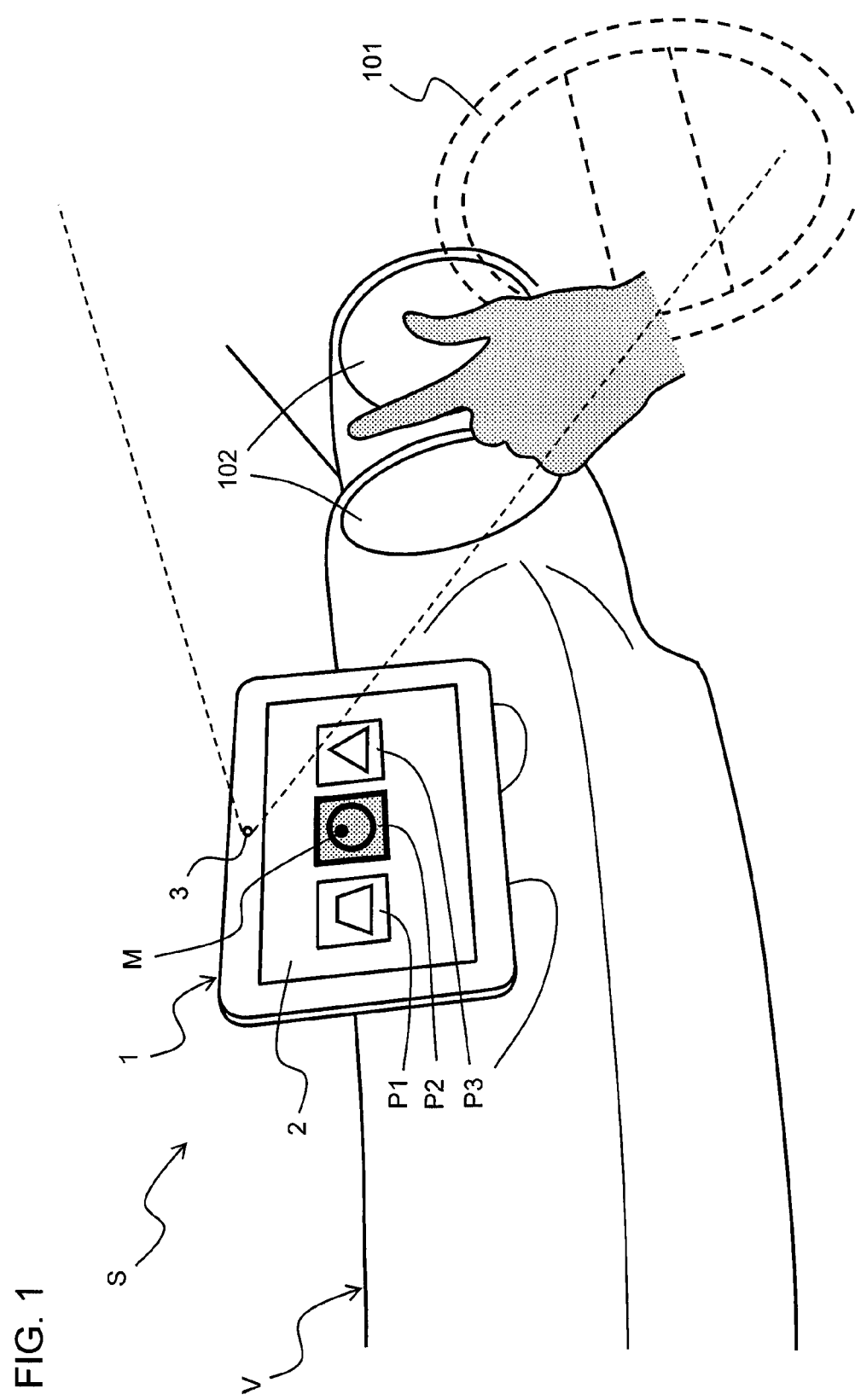
FIG. 1 is a perspective diagram showing one example of gesture operation input using a navigation apparatus including an embodiment of an image recognition device of the present invention.

FIG. 1 is a perspective diagram showing one example of gesture operation input using a navigation apparatus including an embodiment of an image recognition device of the present invention. In this FIG. 1, in a navigation apparatus S, an interface device 1 is fixedly provided on a side of a steering wheel 101 and instruments 102 of a vehicle V, which is a moving body. The interface device 1 of this example is entirely formed in a rectangular plate-like shape, and a front surface thereof includes a display 2 and a device camera 3.

In the shown example, three operation icons P1, P2, and P3 corresponding to various operations to the navigation apparatus S are displayed in line on the display. A user on a driver seat (or a front passenger seat) only points a space of a front side of a display position of the display 2 by a forefinger without directly touching on the display 2, and thereby the navigation apparatus S image-recognizes a position of the fingertip in real time through the device camera 3, and displays an indication point M at a corresponding position on the display 2 as a pointing marker. Additionally, when the indication point M rests for a certain time, the navigation apparatus S detects that any operation icon (the operation icon P2 in the shown example) at which the indication point M is located at that time has been selected and operated.

Figure 2:
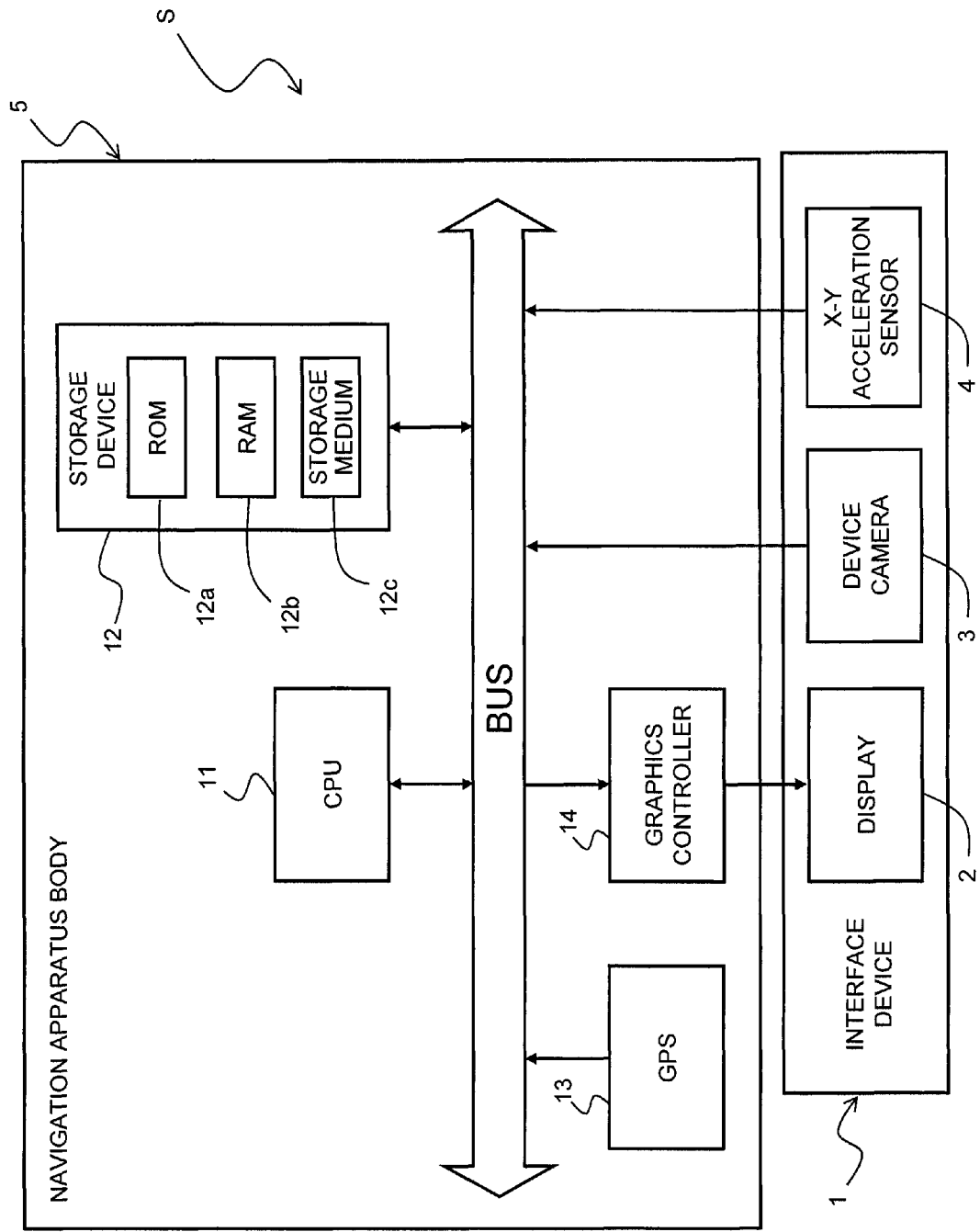
FIG. 2 is a block diagram showing a hardware configuration example of the navigation apparatus.

FIG. 2 is a block diagram showing a hardware configuration example of the navigation apparatus S. In this FIG. 2, the navigation apparatus S has the interface device 1 and a navigation apparatus body 5.

The interface device 1 also includes thereinside an X-Y acceleration sensor 4 in addition to the above-mentioned display 2 and device camera 3.

The display 2, for example, includes an LCD panel etc., and has a function to display various information screens based on an image signal input from a graphics controller (mentioned later) of the navigation apparatus body 5.

The device camera 3 corresponds to an imaging unit, and has a function to capture an image mainly toward an intermediate direction of a driver side and a front passenger side (or turnably therearound) in an interior of the above-mentioned vehicle V, for example, utilizing a CCD image sensor etc., and to output a corresponding signal to a CPU (mentioned later) of the navigation apparatus body 5. It is to be noted that the device camera 3 captures an interior image in a video format by time-sequentially continuing to capture a plurality of image frames with a sufficiently short time period. In addition, the device camera 3 is fixed to the interface device 1 in a state where its imaging direction is directed in substantially a same direction as a display direction of the above-described display 2 so that the gesture operation input shown in the above-described FIG. 1 can be performed.

The X-Y acceleration sensor 4 has a function to detect an acceleration added to the device camera 3 at two axes respectively corresponding to an X direction and a Y direction of an imaging area X-Y of the device camera 3, which will be mentioned later, for example, utilizing a piezoresistive MEMS element etc.

The navigation apparatus body 5 has: a CPU 11; a storage device 12; a GPS 13; and a graphics controller 14.

The CPU 11 performs various calculations by operation of a predetermined program, and has a function to control the whole navigation apparatus S by exchanging information with other respective units and outputting various control instructions.

The storage device 12 has: a ROM 12a; a RAM 12b; and a storage medium 12c. The ROM 12a is an information storage medium in which various processing programs and other necessary information have been previously written. The RAM 12b is an information storage medium in which performed are writing and reading of information necessary to execute the above-described various programs. The storage medium 12c is a non-volatile information storage medium, such as a flash memory and a hard disk, and stores a correspondence relation between an acceleration and a coupled vibration, which will be mentioned later. The storage medium 12c corresponds to a storage unit described in each claim.

The GPS 13 performs positioning of a current location of the vehicle V, and acquires current location information. Using the acquired information, the navigation apparatus S can acquire information of geography, roads, facilities, etc. around the above-described current location based on previously stored map information.

The graphics controller 14 acquires image data from a video RAM (not shown), the GPS 13, etc. by control of the CPU 11, and has a function to display an image signal based on the image data on the above-described display 2.

Figure 3:
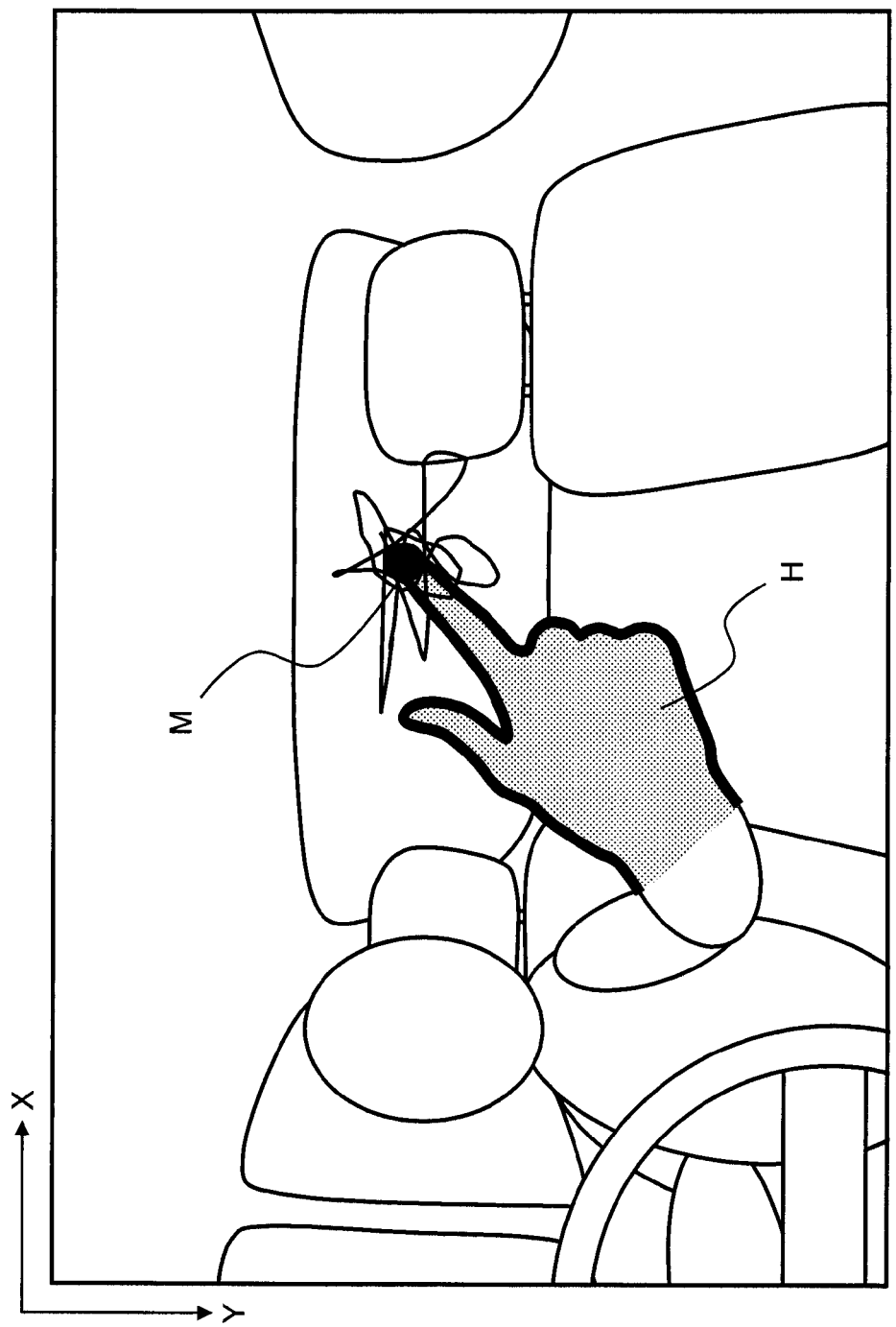
FIG. 3 is one example of a diagram showing a vehicle interior image captured by a device camera.

In the navigation apparatus S configured as described above, the interior image including the user riding on the vehicle V is captured in the video format by the device camera 3, and a shape and a position of a hand H of the user (corresponding to a predetermined body portion of the user) is image-recognized for each image frame. For example, as in an example shown in FIG. 3, a position of the fingertip of the user's forefinger is detected by image recognition on an imaging coordinate X-Y of the interior image captured by the device camera 3, and the position is detected as the indication point M indicated by the user at that point. Here, in the whole vehicle V vibrating in association with running of the vehicle V, the above-described indication point M also vibrates in a deflection direction and with a deflection width that the user does not intend. However, since the deflection direction and the deflection width of the indication point M have a certain correspondence relation with respective accelerations in the X and Y directions detected by the above-described X-Y acceleration, it is possible to perform position correction in response to the vibration by the apparatus and to detect the indication point M presumed that the user originally intends. A technique of this position correction will be explained in detail hereinafter.

Figure 4:
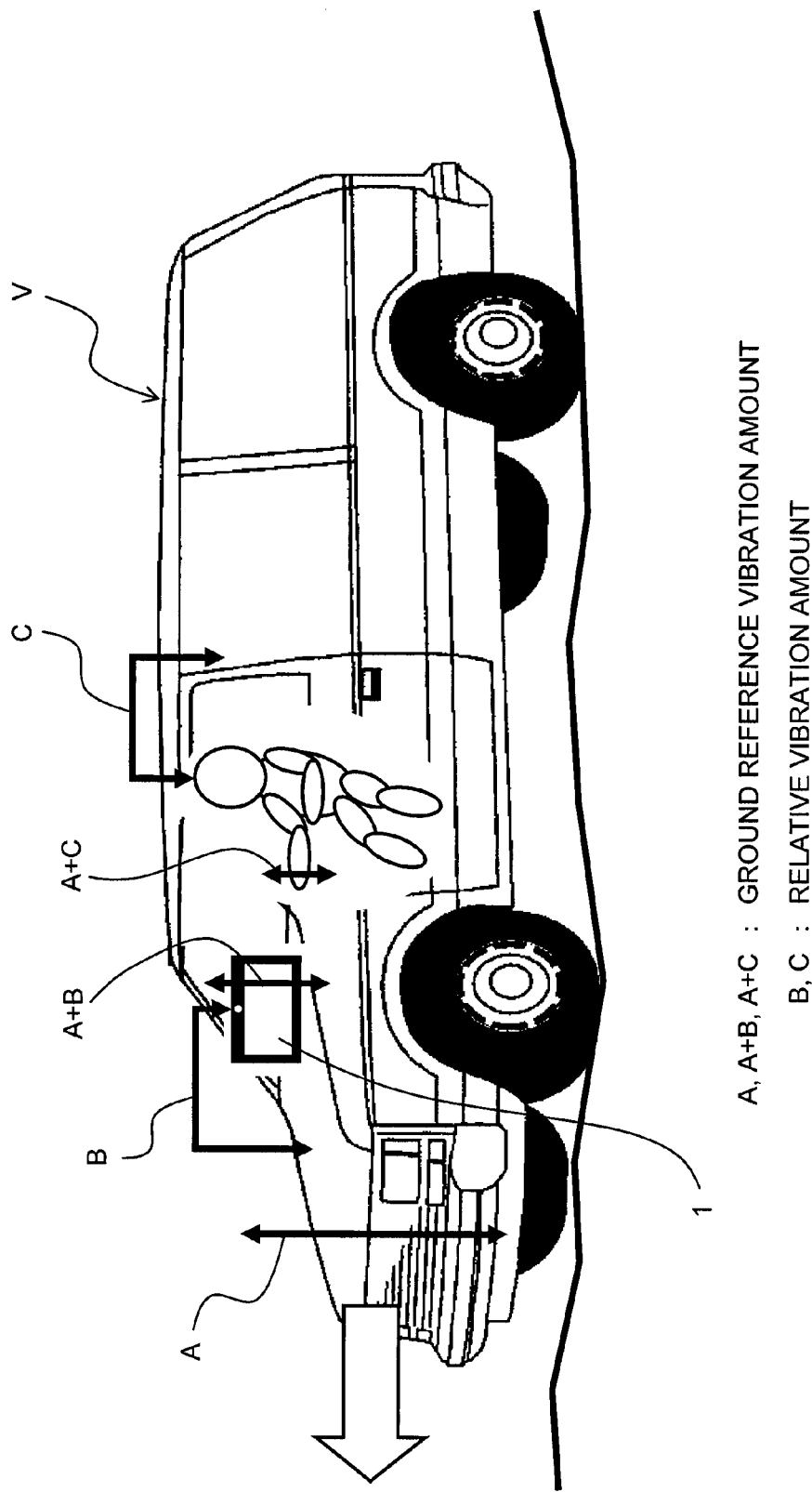
FIG. 4 is one example of a diagram illustrating two types of vibrations included in a vibration of an indication point.

First, two types of vibrations included in a vibration of the indication point M will be explained with reference to FIG. 4. It is to be noted that it is premised that in the following explanation, the user maintains a rest state of his (her) hand without intentionally moving it. In this FIG. 4, for example, the vehicle V runs on an irregular road surface, and thereby a primary direct vibration A is generated in the whole vehicle V.

Since in an example of the present embodiment, the interface device 1 including the device camera 3 and the X-Y acceleration sensor 4 is fixedly installed in the vehicle V, a relative vibration is hardly generated between the interface device 1 itself and the vehicle V with respect to a low-frequency component included in the above-described direct vibration A. However, a secondary relative vibration B occurs between the interface device 1 itself and the vehicle V with respect to a high-frequency component etc. included in an engine vibration and the above-described direct vibration A.

Meanwhile, since a driver and the user who is a fellow passenger only sit down on seats of the vehicle V although bodies thereof have some restraints with seat belts, the body itself of the user is likely to vibrate by the above-described direct vibration A, and a hand portion of the user raised ahead of the interface device 1 in the body of the user corresponds to a tip of a beam, and is relatively likely to sway. That is, a secondary relative vibration C is likely to occur between the hand portion of the user and the vehicle V due to an influence of the above-described direct vibration A.

An acceleration due to a vibration A+B, which is obtained by combining the above-described direct vibration A and relative vibration B, is detected by the X-Y acceleration sensor 4 included in the interface device 1. In addition, a vibration A+C, which is obtained by combining the above-described direct vibration A and relative vibration C, occurs at the hand portion of the user. However, all of the above-described direct vibration A, relative vibrations A+B and A+C are ground vibrations on the basis of a road surface, and in contrast, it is a vibration of the hand of the user in the imaging coordinate X-Y of the device camera 3 that should be corrected in the present embodiment, i.e., a relative vibration B+C between the device camera 3 and the hand of the user. For this reason, if the relative vibrations B and C can be detected and respectively corrected as a vehicle vibration, which is on the basis of the vehicle, not as the ground vibration, which is on the basis of the road surface, the influence of the direct vibration applied to the user on the common vehicle V can be ignored. Hereinafter, the above-described relative vibrations B and C are distinguished as a device vibration and a coupled vibration, respectively.

Figure 5:
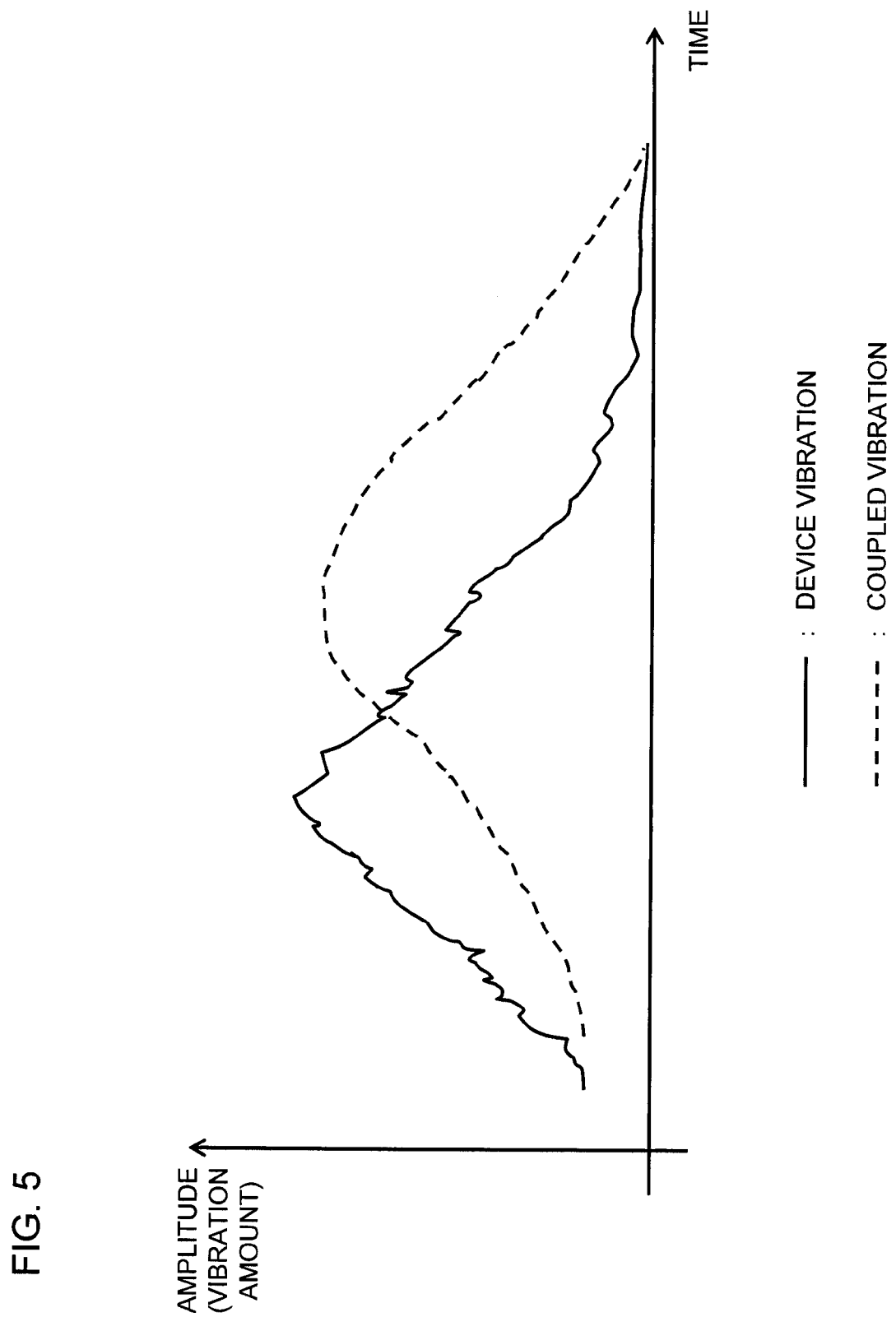
FIG. 5 is one example of a graph illustrating respective characteristics of a device vibration and a coupled vibration.

FIG. 5 is one example of a graph illustrating respective characteristics of the above-described device vibration and coupled vibration. In the shown example, compared and shown are temporal changes of deflection widths of Y direction components of the device vibration and the coupled vibration that occur, for example, after an impulse model vibration (a vibration of an instantaneous unit vibration amount: not shown) is excited in the vehicle V in a Y direction (vertical direction).

A device vibration (refer to a continuous line portion) is first generated after excitation of the impulse model vibration, and after that, a coupled vibration (refer to a dashed line portion) is generated in an overlapping manner with a predetermined time difference. Although both vibrate with a mountain wave form, deviation corresponding to a time difference at the time of generation occurs also at peak timing of the respective vibrations. This is because the interface device 1 fixed by a structural member of the vehicle transmits the device vibration faster, and because the coupled vibration transmitted through a flexible body of the user is generated later.

In addition, in a case of the device vibration, the vibration amount of the device vibration, generation timing and peak timing of the vibration are generated in always a same correspondence relation with respect to a predetermined excitation condition. For this reason, in the present embodiment, the device vibration can be directly estimated based on the accelerations of the two axes detected by the X-Y acceleration sensor 4, and movement deviation (a motion vector) of an interior background of the vehicle V between image frames before and after the generation of the accelerations. For this movement deviation, may just be used a well-known technique in which movement deviation is calculated by means of deviation of a recognized position of a predetermined portion of the vehicle V detected by image recognition on the imaging coordinate X-Y, and detailed explanation is omitted here. In this case, although the above-described direct vibration A is also included in the accelerations of the two axes detected by the X-Y acceleration sensor 4, respectively, a magnitude of each acceleration poses no problem since it is used as a trigger to start detection of the above-described movement deviation.

Meanwhile, in a case of the coupled vibration, even though the excitation condition is the same, a deflection width (corresponding to a vibration amount), and generation timing and peak timing (corresponding to vibration timing) of the vibration differ depending on various individual conditions, such as a weight of each body portion (for example, an arm etc.) of the user and flexibility of joints. In contrast with this, in the present embodiment, a user who uses the navigation apparatus S at that time is preset, a correspondence relation of the acceleration detected by the X-Y acceleration sensor 4 and the coupled vibration is analyzed and stored, and thereby a characteristic of the coupled vibration corresponding to the user is learned. Additionally, when learning proficiency to the user is sufficient, the coupled vibration corresponding to the user can be detected with high accuracy by checking against a learning result the acceleration detected by the above-described X-Y acceleration sensor. It is to be noted that in the example of the present embodiment, the deflection width of the coupled vibration is detected by means of a separation distance (corresponding to deviation) between the indication point M at that time on the imaging coordinate X-Y and a center position (corresponding to a predetermined position in an imaging coordinate) of the operation icon P1, P2, or P3. In addition, although in this case as well, the above-described direct vibration A is also included in the accelerations of the two axes detected by the X-Y acceleration sensor 4, respectively, there is no problem since the direct vibration A and the coupled vibration (relative vibration C) are in a proportional relation, and the correspondence relation (for example, a coefficient) between the acceleration and the coupled vibration is stored in the above-described learning.

Figure 6:
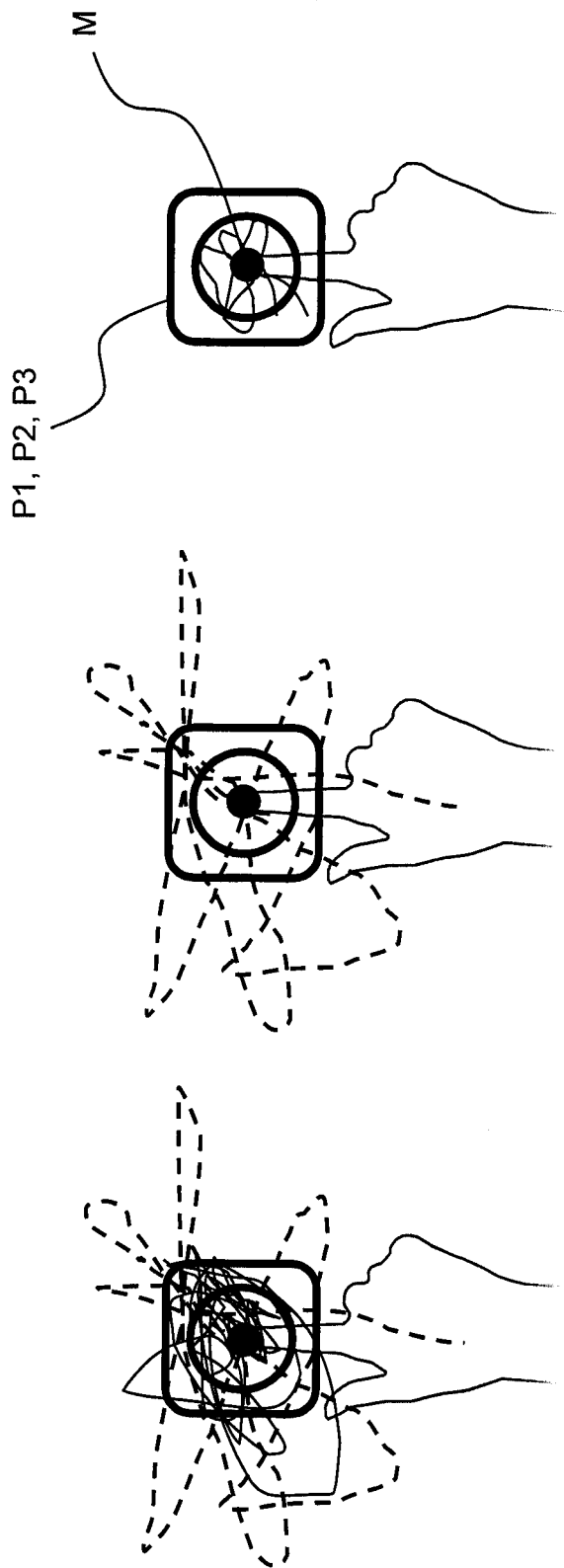
FIG. 6A is one example of a diagram illustrating a case without correction to the vibration of the indication point.
FIG. 6B is one example of a diagram illustrating a case where correction is performed to the vibration of the indication point only by the device vibration.
FIG. 6C is one example of a diagram illustrating a case where correction is performed to the vibration of the indication point by both the device vibration and the coupled vibration.

For example, when no correction is performed to the vibration as shown in FIG. 6A, the indication point M largely sways by the vibration, which is a synthesis of the device vibration shown with a continuous line and the coupled vibration shown with a dashed line. In contrast with this, when position correction of the captured image is performed in response to the device vibration detected by the above-described well-known technique, the indication point M vibrates only by the coupled vibration shown with the dashed line as shown in FIG. 6B. Additionally, in the present embodiment, position correction of the captured image is further performed also to the user-based coupled vibration detected by the above-described learning, and thereby vibration of the indication point M can be substantially suppressed as shown in FIG. 6C. As described above, the indication point M originally intended by the user can be estimated with high accuracy by performing position correction of the captured image in response to both the device vibration and the coupled vibration.

Figure 7:
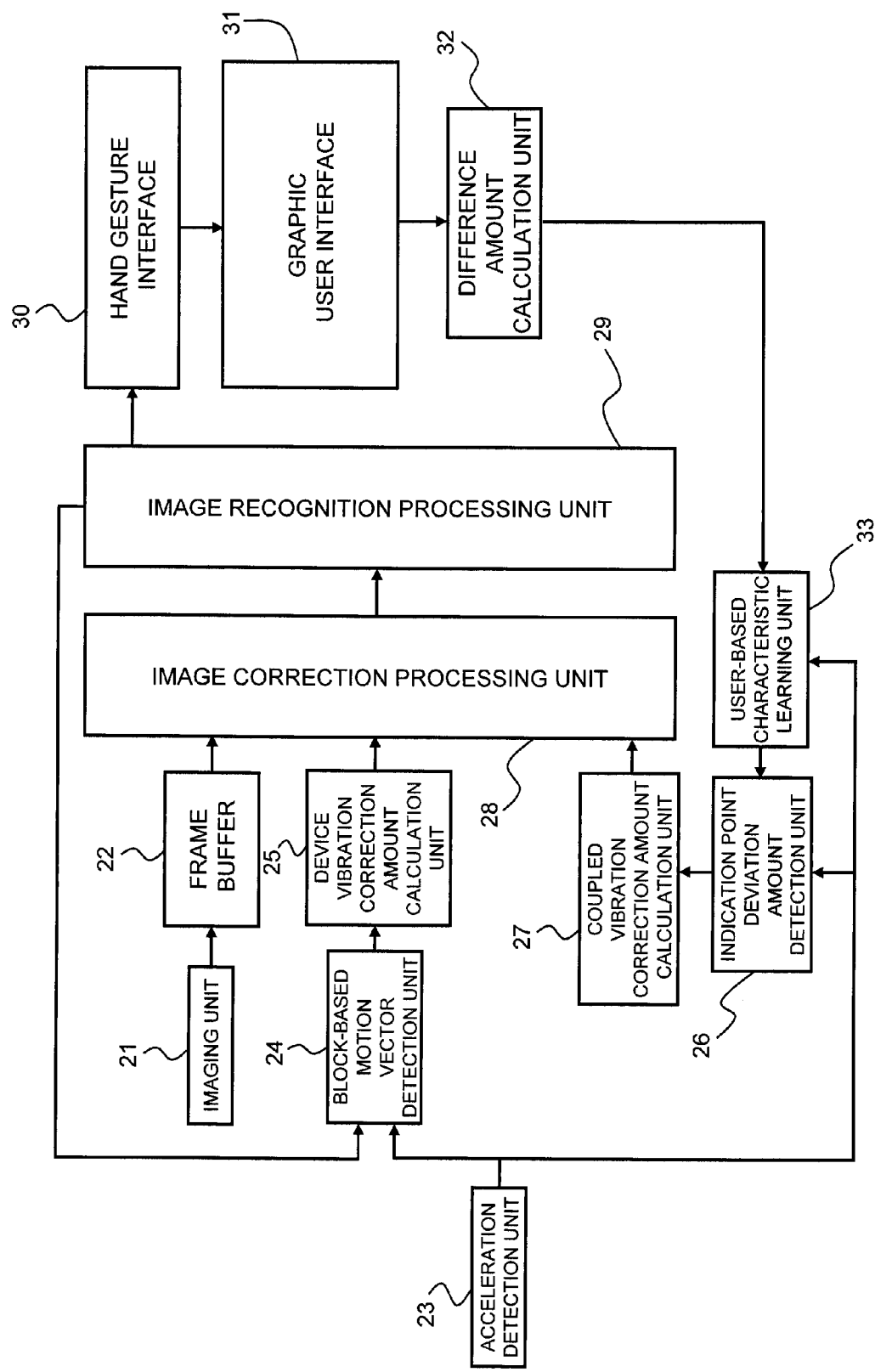
FIG. 7 is a block diagram showing a software configuration example related to the gesture operation input of the navigation apparatus.

FIG. 7 is a block diagram showing a software configuration example related to the above-described gesture operation input utilizing the above-mentioned position correction technique. In this FIG. 7, a software block related to the gesture operation input has: an imaging unit 21; a frame buffer 22; an acceleration detection unit 23; a block-based motion vector detection unit 24; a device vibration correction amount calculation unit 25; an indication point deviation amount detection unit 26; a coupled vibration correction amount calculation unit 27; an image correction processing unit 28; an image recognition processing unit 29; a hand gesture interface 30; a graphic user interface 31; a difference amount calculation unit 32; and a user-based characteristic learning unit 33.

The imaging unit 21 performs imaging in units of an image frame in a hardware manner on the imaging coordinate X-Y corresponding to an imaging direction of the device camera 3.

Each image frame captured by the imaging unit 21 is time-sequentially stored in the frame buffer 22.

The acceleration detection unit 23 detects accelerations respectively in the X and Y directions in the X-Y acceleration sensor 4 in a hardware manner.

The block-based motion vector detection unit 24 detects as a motion vector movement deviation between image frames before and after the detection of an acceleration corresponding to a vibration not less than a predetermined amount, as for a position of a block portion image-recognized clearly as a predetermined portion (for example, a head rest etc.) of the vehicle V among divided blocks of the image frame. This detection processing of the motion vector may just be performed using a well-known technology for image position correction with respect to a vibration, and detailed explanation is omitted here.

The device vibration correction amount calculation unit 25 calculates a position correction amount of an image frame for the device vibration corresponding to the imaging coordinate X-Y based on an inverse vector of the motion vector detected by the above-described block-based motion vector detection unit 24.

The indication point deviation amount detection unit 26 refers to the characteristic of the user-based coupled vibration learned by the user-based characteristic learning unit 33, which will be mentioned in detail later, and detects a coupled vibration corresponding to the acceleration detected by the above-described acceleration detection unit 23 as a coordinate deviation amount of the indication point M.

The coupled vibration correction amount calculation unit 27 calculates the position correction amount of the image frame for the coupled vibration corresponding to the imaging coordinate X-Y based on the coordinate deviation amount of the indication point M detected by the above-described indication point deviation amount detection unit 26.

The image correction processing unit 28 adds the correction amount for the device vibration calculated by the above-described device vibration correction amount calculation unit 25, and the correction amount for the coupled vibration calculated by the above-described coupled vibration correction amount calculation unit 27 to calculate a final effective correction amount, and performs position correction on the imaging coordinate X-Y with respect to the image frame of the corresponding timing that has been read from the above-described frame buffer 22.

The image recognition processing unit 29 image-recognizes shapes and positions of vehicle portions, such as a hand of the user and a head rest on the imaging coordinate X-Y in the image frame in which position correction has been performed by the above-described image correction processing unit 28.

The hand gesture interface 30 recognizes a position of the indication point M based on a recognition result of the above-described image recognition processing unit 29, and estimates an indication position on the display 2 intended by the user at that time.

The graphic user interface 31 determines the operation icon P1, P2, or P3 that the user is going to select based on arrangement of the operation icons P1, P2, and P3 that are displayed on the display 2 at that time, and the indication position estimated by the above-described hand gesture interface 30.

The difference amount calculation unit 32 calculates as a difference amount a separation distance between the position of the indication point M at that time, and the center position of the operation icon P1, P2, or P3 determined by the above-described graphic user interface 31 as a selection object.

The user-based characteristic learning unit 33 regards as a deflection width of the coupled vibration the difference amount calculated by the above-described difference amount calculation unit 32, analyzes a correspondence relation of the deflection width and the acceleration detected by the X-Y acceleration sensor 4, stores it in the above-described storage medium 12c, and thereby learns a characteristic of the coupled vibration corresponding to the user at that time.

Figure 8:
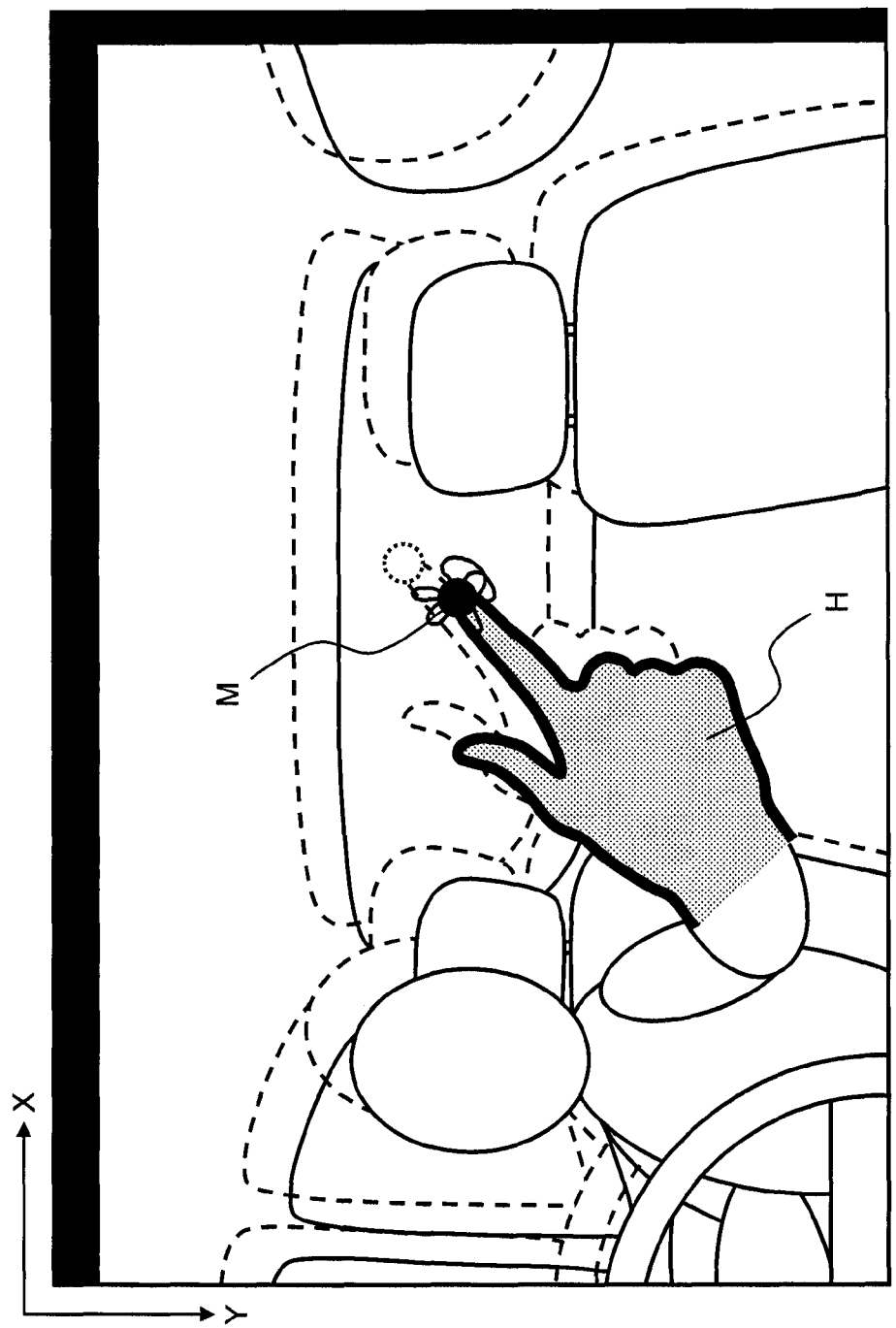
FIG. 8 is one example of a diagram showing a case of having performed position correction of the vehicle interior image captured by the device camera.

In the gesture operation input by means of the above software configuration, position correction to the imaging coordinate X-Y corresponding to capture timing of each image frame can be performed with respect to the each image frame stored in the frame buffer 22 by combining the correction amount for the device vibration calculated by the device vibration correction amount calculation unit 25 with the correction amount for the coupled vibration calculated by the coupled vibration correction amount calculation unit 27. This position correction corrects the position of the whole image frame with respect to an original imaging coordinate X-Y, for example, as shown in FIG. 8 corresponding to the above-described FIG. 3. Additionally, when the image frame in which position correction has been performed as described above is switched in order of imaging although not particularly shown, the position of the indication point M is stabilized. That is, even though the hand of the user actually vibrates in a coupled manner by an inevitable force while the user intentionally maintains a resting state of the indication point M, the position of the indication point M can be stabilized at the navigation apparatus S side in response to the coupled vibration.

It is to be noted that the above-described imaging unit 21 corresponds to an imaging step described in each claim in the software block diagram of the above-described FIG. 8. In addition, the above-described acceleration detection unit 23 corresponds to an acceleration detection unit and an acceleration detection step described in each claim. In addition, the above-described indication point deviation amount detection unit 26 and the above-described coupled vibration correction amount calculation unit 27 correspond to a coupled vibration detection unit and a coupled vibration detection step described in each claim, and the above-described difference amount calculation unit 32 and user-based characteristic learning unit 33 correspond to a learning unit described in each claim. In addition, the above-described image correction processing unit 28 corresponds to a correction unit and a correction step described in each claim. In addition, the above-described image recognition processing unit 29 corresponds to a recognition unit and a recognition step described in each claim. In addition, the above-described block-based motion vector detection unit 24 and device vibration correction amount calculation unit 25 correspond to a device vibration detection unit described in each claim.

Figure 9:
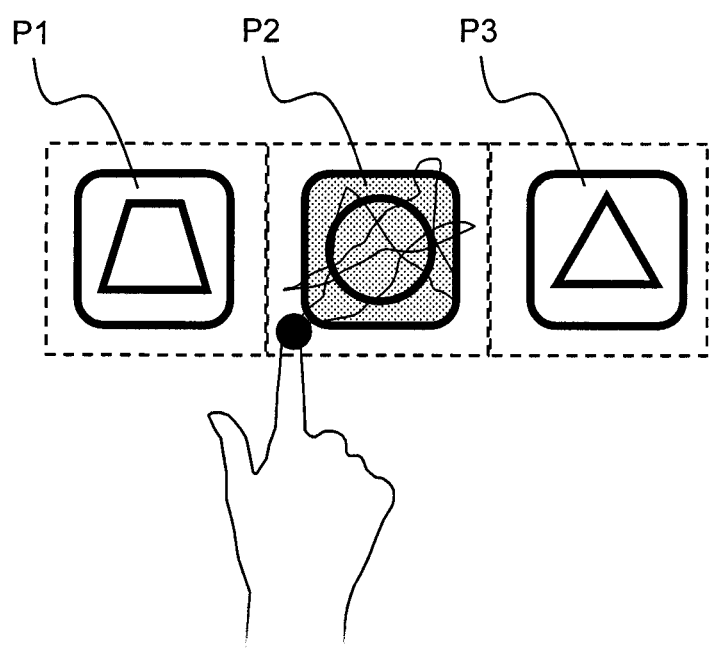
FIG. 9 is one example of a diagram showing pull-in processing of the indication point to an operation icon.

In addition, in the present embodiment, pull-in processing of the indication point M to the operation icons P1, P2, and P3 is performed as shown in FIG. 9. In this process, even when the operation icons P1, P2, and P3 adjacent to each other on the display 2 are displayed to be separated from each other, a determination effective area of the indication point M corresponding to each of the operation icons P1, P2, and P3 is set to be extended to an intermediate position between the icons. Consequently, even when the indication point M temporarily deviates out of a display area of operation icon P2 due to the vibration as shown in FIG. 9, a selection state of the operation icon P2 can be maintained. This pull-in processing is effective, for example, for operation in which the selection state of the icon needs to be maintained for a user's arbitrary time. In addition, since the selection state of the operation icon P1, P2, or P3 can be maintained for a long time, the pull-in processing is effective in a point where a learning state of the coupled vibration can also be maintained for a long time.

Figure 10:
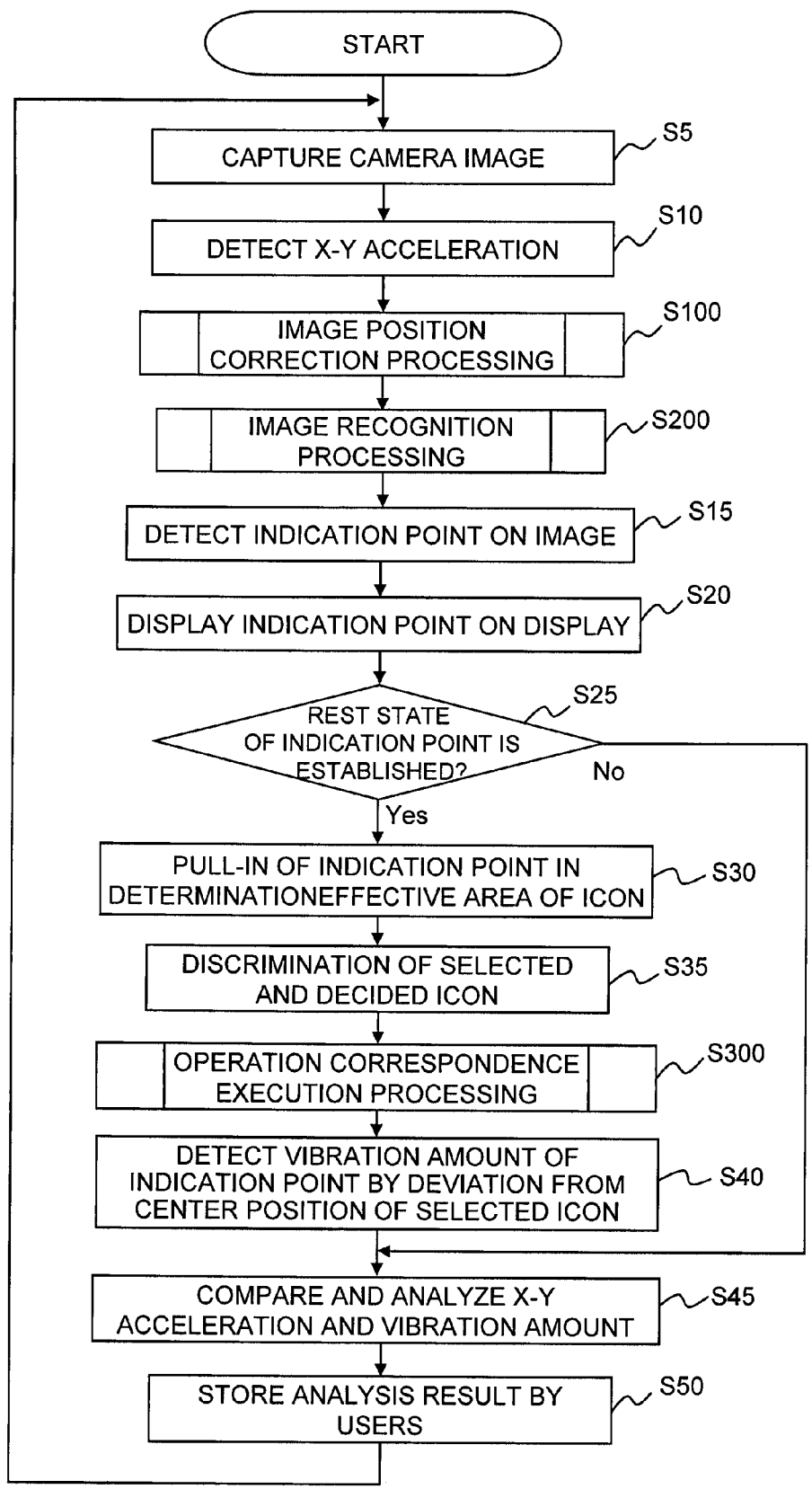
FIG. 10 is one example of a flow chart representing control contents executed by a CPU of a navigation apparatus body.

FIG. 10 is one example of a flow chart representing control contents executed by the CPU 11 of the navigation apparatus body 5 in order to achieve an operation aspect explained above. It is to be noted that the flow is called and executed, for example, in the above-described graphic user interface requesting gesture operation input, while the device camera 3 is capturing the interior image in the video mode. In addition, before this flow is executed, it is necessary to set which user of users who are previously registered performs gesture operation input this time.

In FIG. 10, first, in step S5, an interior image of only one image frame is captured by the device camera 3.

The process moves to step S10, and detects accelerations of the two axes in the X and Y directions by the X-Y acceleration sensor 4.

The process moves to step S100, and executes image position correction processing that performs position correction on the imaging coordinate X-Y with respect to the image frame captured in the above-described step S5 based on the accelerations detected in the above-described step S10.

The process moves to step S200, and executes image recognition processing that image-recognizes the hand of the user in the image frame in which position correction has been performed in the above-described step S100. It is to be noted that since processing contents in procedures of the above-described step S100 and this step S200 are not particularly shown as a flow, refer to the above-described software configuration of FIG. 7.

The process moves to step S15, and detects a position of the indication point M on the imaging coordinate X-Y based on a recognition result of the above-described step S200.

The process moves to step S20, and displays the indication point M as a pointing marker on the display 2.

The process moves to step S25, and determines whether or not to be able to estimate that a state is the state where the user has intentionally made the indication point M rest. If it is estimated that the state is the state where the user still intentionally moves the indication point M, the determination is not satisfied, and the process moves to step S45.

Meanwhile, if it is estimated that a rest state of the indication point M has been established in the above-described determination of step S25, the determination is satisfied, and the process moves to step S30.

In step S30, performed is pull-in processing of the indication point M in the determination effective area of the operation icons P1, P2, and P3 (refer to the above-described FIG. 9).

The process moves to step S35, and discriminates which operation icon is selected and decided by the user of the operation icons P1, P2, and P3, by a position of the indication point M at that time and the pull-in processing in the above-described step S30.

The process moves to step S300, and performed operation correspondence execution processing that executes operation processing corresponding to the operation icon P1, P2, or P3 discriminated in the above-described step S35.

The process moves to step S40, and detects a deflection width of a coupled vibration of the indication point M by deviation from a center position of the operation icon P1, P2, or P3 discriminated in the above-described step S35.

The process moves to step S45, and compares and analyzes a relation between the acceleration detected in the above-described step S10 and the deflection width of the coupled vibration detected in the above-described step S40 in two axes in the X and Y directions.

The process moves to step S50, and stores an analysis result in the above-described step S45 in the above-described storage medium 12c corresponding to the user set at that time. The process then returns to step S5, and repeats a similar procedure.

As explained above, the navigation apparatus S of the above-described embodiment includes: the device camera 3 (corresponding to an imaging unit) that is disposed in the vehicle V (corresponding to the moving body), and captures an image of a user riding on the vehicle V; the acceleration detection unit 23 (corresponding to an acceleration detection unit) that detects an acceleration added to the device camera 3; the indication point deviation amount detection unit 26 and the coupled vibration correction amount calculation unit 27 (corresponding to a coupled vibration detection unit) that detect a relative coupled vibration between the vehicle V and the user based on the acceleration; and the image recognition processing unit 29 (corresponding to a recognition unit) that recognizes a position of a hand (corresponding to a predetermined body portion) of the user based on the image captured by the device camera 3 and the coupled vibration.

In addition, in an image recognition method executed by the navigation apparatus S of the above-described embodiment, executed are: an imaging unit 21 (corresponding to an imaging step) that captures an image of a user riding on the vehicle V by the device camera 3 (corresponding to an imaging unit) disposed in the vehicle V (corresponding to the moving body); the acceleration detection unit 23 (corresponding to an acceleration detection step) that detects an acceleration added to the device camera 3; the indication point deviation amount detection unit 26 and the coupled vibration correction amount calculation unit 27 (corresponding to a coupled vibration detection step) that detect a relative coupled vibration between the vehicle V and the user based on the acceleration; and the image recognition processing unit 29 (corresponding to a recognition step) that recognizes a position of a hand (corresponding to a predetermined body portion) of the user based on the image captured by the imaging unit 21 and the coupled vibration.

With this configuration, can be detected the coupled vibration that relatively occurs between the vehicle V and the hand of the user due to an influence of the direct vibration A of the vehicle V, and it becomes possible to recognize the position of the hand of the user in consideration of this coupled vibration in the captured image of the device camera 3. As a result of this, recognition accuracy can be improved in position recognition of the hand of the user riding on the vehicle V being performed by means of the captured image of the device camera 3 mounted on the vehicle V.

Furthermore, in addition to the above-mentioned configuration, the navigation apparatus S further includes the image correction processing unit 28 (corresponding to a correction unit) that corrects a position of the whole image with respect to the imaging coordinate X-Y of the device camera 3 based on the image and the coupled vibration, and in the navigation apparatus S, the image recognition processing unit 29 recognizes the position of the hand of the user from the image of a position corrected by the image correction processing unit 28.

With this configuration, position correction of the captured image itself can be performed so as to cancel a deflection component of the hand of the user that occurs in the imaging coordinate X-Y due to the coupled vibration, and it is possible to improve recognition accuracy in performing position recognition of the hand of the user.

Furthermore, in addition to the above-mentioned configuration, the navigation apparatus S further includes the difference amount calculation unit 32 and the user-based characteristic learning unit 33 (corresponding to a learning unit) that analyze by individual users a correspondence relation of the acceleration detected by the acceleration detection unit 23, and a vibration amount and vibration timing of the position of the hand of the user, and stores it in the storage medium 12c (corresponding to a storage unit), and in the navigation apparatus S, the indication point deviation amount detection unit 26 and the coupled vibration correction amount calculation unit 27 detect the coupled vibration from the acceleration detected by the acceleration detection unit 23 based on the correspondence relation stored by the difference amount calculation unit 32 and the user-based characteristic learning unit 33 with respect to the user imaged by the device camera 3.

With this configuration, characteristics of coupled vibrations, such as a deflection width that changes with various individual conditions, and generation timing and peak timing of a vibration, can be learned by users. Additionally, when learning proficiency to the user is sufficient, the coupled vibration corresponding to the user can be detected with high accuracy by checking the detected acceleration against a learning result.

Furthermore, in addition to the above-mentioned configuration, the difference amount calculation unit 32 and the user-based characteristic learning unit 33 detect the vibration amount based on deviation between the center position (corresponding to a predetermined position in the imaging coordinate) of the operation icon P1, P2, or P3 in the imaging coordinate X-Y and the position of the hand of the user.

With this configuration, particularly, the hand of the user has rested while the user selects and decides the operation icon P1, P2, or P3, and thus the deviation between the center position of the operation icon P1, P2, or P3 selected during the rest state and the indication point M indicated by the hand of the user can be accurately detected as it is as the deflection width of the coupled vibration. That is, the characteristic of the coupled vibration of the user can be accurately learned excepting an influence of intentional hand movement of the user as much as possible. In addition, particularly, the deviation between the center position of the selected and decided operation icon P1, P2, or P3 and the indication point M is set as the vibration amount, thereby a habit of the user with respect to the gesture operation input, etc. can be learned, and thus determination accuracy of the gesture operation input can also be improved.

Furthermore, in addition to the above-mentioned configuration, the navigation apparatus S further includes the block-based motion vector detection unit 24 and the device vibration correction amount calculation unit 25 (corresponding to a device vibration detection unit) that detect a relative device vibration between the vehicle V and the device camera 3 based on the acceleration, and in the navigation apparatus S, the image correction processing unit 28 corrects the position of the whole image with respect to the imaging coordinate X-Y based on both the coupled vibration and the device vibration.

With this configuration, can be detected the device vibration that relatively occurs between the vehicle V and the device camera 3 due to the influence of the direct vibration A of the vehicle V, and position correction of the captured image itself can be performed so as to cancel a deflection component of the hand of the user that occurs in the imaging coordinate X-Y due to this device vibration. It is to be noted that when the device vibration (the relative vibration B in the above-described FIG. 4) is small enough to be able to be ignored since, for example, the interface device 1 is firmly fitted into an instrument panel of the vehicle V, or a suitable damper structure that can absorb the device vibration is provided, etc., detection of the device vibration and position correction of the corresponding image are not needed.

Furthermore, in addition to the above-mentioned configuration, the device camera 3 images the hand of the user as an image in a video format including a plurality of time-sequentially captured image frames, the image recognition processing unit 29 recognizes together a position of a predetermined portion of the vehicle V from the image frames, and the block-based motion vector detection unit 24 and the device vibration correction amount calculation unit 25 detect the device vibration based on deviation of the position of the predetermined portion between the image frames before the detection of the acceleration and the image frames after the detection of the acceleration.

With this configuration, only the device vibration can be detected independently of the coupled vibration of the hand of the user to thereby perform position correction of the corresponding image. It is to be noted that in the present invention, detection of the device vibration and position correction of the image may be performed by another technique without being limited to the above-described technique.

In addition, techniques according to the above-described embodiment and each modified example may be appropriately combined and utilized other than the techniques having been already mentioned above.

What is claimed is:
1. An image recognition device comprising:
an imaging unit disposed in a moving body, that captures an image of a user riding on the moving body;
an acceleration detection unit that detects an acceleration added to said imaging unit;
a device vibration detection unit that detects a relative device vibration between said moving body and said imaging unit wherein the relative device vibration occurs due to the vibration of said moving body based on said acceleration;
a coupled vibration detection unit that detects a coupled vibration as a relative vibration of a predetermined body portion of the user that is an object to be captured by said imaging unit wherein the coupled vibration occurs due to a vibration of said moving body; and a recognition unit that recognizes a position of the predetermined body portion of said user based on said image captured by said imaging unit, the device vibration detected by said device vibration detection unit, and said coupled vibration detected by said coupled vibration detection unit.

2. The image recognition device according to claim 1, further comprising a correction unit that corrects a position of the whole of said image with respect to an imaging coordinate of said imaging unit based on said image and said coupled vibration, wherein said recognition unit recognizes the position of said predetermined body portion of the user by said image of the position corrected by said correction unit.

3. The image recognition device according to claim 1, wherein:

said imaging unit images said predetermined body portion with an image in a video format including a plurality of time-sequentially captured image frames, said recognition unit recognizes also a position of a predetermined portion of said moving body by said image frames, and said device vibration detection unit detects said device vibration based on deviation between the position of said predetermined portion in image frames before the detection of said acceleration and the position of said predetermined portion in image frames after the detection of said acceleration.

4. The image recognition device according to claim 1, further comprising a vibration detection unit that detects a vibration of said moving body, wherein said coupled vibration detection unit detects the coupled vibration as the relative vibration of the predetermined body portion of the user that is the object to be captured by said imaging unit wherein the coupled vibration occurs due to the vibration of said moving body, in accordance with the vibration of said moving body detected by said vibration detection unit.

5. The image recognition device according to claim 4, further comprising a memory that stores correspondence relation between a vibration of said moving body and a vibration of the predetermined body portion of the user that is the object to be captured by said imaging unit, wherein said coupled vibration detection unit detects the coupled vibration as the relative vibration of the predetermined body portion of the user that is the object to be captured by said imaging unit wherein the coupled vibration occurs due to the vibration of said moving body, in accordance with the vibration of said moving body and said correspondence relation stored in said memory.

6. The image recognition device according to claim 5, further comprising a setting unit that sets a user intending to practice a gesture input, wherein said memory stores said correspondence relation by individual users, and said coupled vibration detection unit detects the coupled vibration of the user set by said setting unit in accordance with the vibration of said moving body and said correspondence relation corresponding to the user.

7. The image recognition device according to claim 5, wherein said vibration detection unit detects the vibration of said moving body in accordance with said acceleration detected by said acceleration detection unit.

8. An image recognition method executing the steps of:

an imaging step for capturing an image of a user riding on a moving body by an imaging unit disposed in the moving body;

an acceleration detection step for detecting an acceleration added to said imaging unit;

a vibration detection step that detects a relative device vibration between said moving body and said imaging unit wherein the relative device vibration occurs due to the vibration of said moving body based on said acceleration;

a coupled vibration detection step for detecting a coupled vibration as a relative vibration of a predetermined body portion of the user that is an object to be captured by said imaging unit wherein the coupled vibration occurs due to a vibration of said moving body; and a recognition step for recognizing a position of a predetermined body portion of said user based on said image captured in said imaging step, the device vibration detected in the vibration detection step and said coupled vibration detected in the coupled vibration detection step.

9. An image recognition device comprising:

a camera disposed in a moving body, that captures an image of a user riding on the moving body;

an acceleration detector that detects an acceleration added to said camera;

a device vibration detector that detects a relative device vibration between said moving body and said camera wherein the relative device vibration occurs due to the vibration of said moving body based on said acceleration;

a coupled vibration detector that detects a coupled vibration as a relative vibration of a predetermined body portion of the user that is an object to be captured by said camera wherein the coupled vibration occurs due to a vibration of said moving body; and a recognizer that recognizes a position of the predetermined body portion of said user based on said image captured by said camera, the device vibration detected by said device vibration detector, and said coupled vibration detected by said coupled vibration detector.

* * * * *